US012650851B2

(12) United States Patent
Qu et al.

(10) Patent No.: US 12,650,851 B2
(45) Date of Patent: Jun. 9, 2026

(54) PCIE DEVICE MANAGEMENT ARCHITECTURE, METHOD, AND SYSTEM, DEVICE, AND MEDIUM

(71) Applicant: Suzhou MetaBrain Intelligent Technology Co., Ltd., Suzhou (CN)

(72) Inventors: Yan Qu, Suzhou (CN); Xiubo Zhang, Suzhou (CN); Xiangyu Wang, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 19/115,457

(22) PCT Filed: Jun. 5, 2024

(86) PCT No.: PCT/CN2024/097603
§ 371 (c)(1),
(2) Date: Mar. 26, 2025

(87) PCT Pub. No.: WO2025/016086
PCT Pub. Date: Jan. 23, 2025

(65) Prior Publication Data
US 2026/0003640 A1    Jan. 1, 2026

(30) Foreign Application Priority Data
Jul. 19, 2023    (CN) .......................... 202310884018.1

(51) Int. Cl.
*G06F 9/4401*        (2018.01)
*G06F 13/40*         (2006.01)
*G06F 13/42*         (2006.01)
(52) U.S. Cl.
CPC ........ *G06F 9/4411* (2013.01); *G06F 13/4282* (2013.01); *G06F 2213/0026* (2013.01)

(58) Field of Classification Search
CPC .......................... G06F 3/0632; G06F 13/4022
See application file for complete search history.

(56) References Cited

U.S. PATENT DOCUMENTS

| 10,521,376 B1 * | 12/2019 | Mitra | .................... G06F 3/0632 |
| 2020/0073840 A1 * | 3/2020 | Mekad | ................ G06F 13/4022 |

(Continued)

FOREIGN PATENT DOCUMENTS

| CN | 204046631 U | 12/2014 |
| CN | 111352889 A | 6/2020 |

(Continued)

OTHER PUBLICATIONS

International Search Report of corresponding PCT application (PCT/CN2024/097603) Sep. 20, 2024 including English translation (5 pages).

(Continued)

*Primary Examiner* — Getente A Yimer
(74) *Attorney, Agent, or Firm* — Crowell & Moring LLP

(57) ABSTRACT

The present application relates to the technical field of servers, and in particular relates to a PCIE device management architecture, method and system, and a device and a medium. The method includes: acquiring a driver program of a first PCIE switch chip, installing the driver program of the first PCIE switch chip to a baseboard management controller, and establishing a PCIE specification and protocol for communication between a baseboard management controller chip and the first PCIE switch chip; configuring a first PCIE controller in the baseboard management controller to be in an RC mode, and configuring a second PCIE controller of a central processing unit to be in an EP mode; and managing a PCIE device by means of the baseboard management controller configured in the RC mode, thereby (Continued)

improving management efficiency of the baseboard management controller over the PCIE device.

17 Claims, 3 Drawing Sheets

(56)                    References Cited

U.S. PATENT DOCUMENTS

| | | | |
|---|---|---|---|
| 2020/0311008 A1 | 10/2020 | Saha et al. | |
| 2020/0379930 A1 | 12/2020 | Brownell et al. | |
| 2020/0409901 A1* | 12/2020 | Iyer | G06F 15/7867 |
| 2022/0114131 A1* | 4/2022 | Pappu | G06F 13/4022 |
| 2023/0120652 A1* | 4/2023 | Stevens | G06F 9/4406 |
| | | | 710/313 |
| 2023/0123999 A1 | 4/2023 | Ballard et al. | |
| 2023/0126468 A1 | 4/2023 | Bolen | |
| 2023/0205719 A1 | 6/2023 | Zhang et al. | |
| 2023/0297390 A1* | 9/2023 | Hung | G06F 9/4401 |
| | | | 713/2 |
| 2024/0006827 A1* | 1/2024 | Wang | H01R 12/721 |

FOREIGN PATENT DOCUMENTS

| | | | |
|---|---|---|---|
| CN | 111666236 A | 9/2020 | |
| CN | 112306913 A | 2/2021 | |
| CN | 113419977 A | 9/2021 | |
| CN | 115277348 A | 11/2022 | |
| CN | 116610373 A | 8/2023 | |

OTHER PUBLICATIONS

Written Opinion of International Searching Authority of corresponding PCT application (PCT/CN2024/097603) Sep. 20, 2024 including English translation (6 pages).
Search report of corresponding CN priority application (CN202310884018.1) Aug. 21, 2023 (2 pages).
Notification to Grant Patent Right for Invention of corresponding CN priority application (CN202310884018.1) Aug. 28, 2023 including English translation (2 pages).
Extended European Search Report issued in EP Application No. 24842086.1 dated Jan. 28, 2026 (7 pages).

* cited by examiner

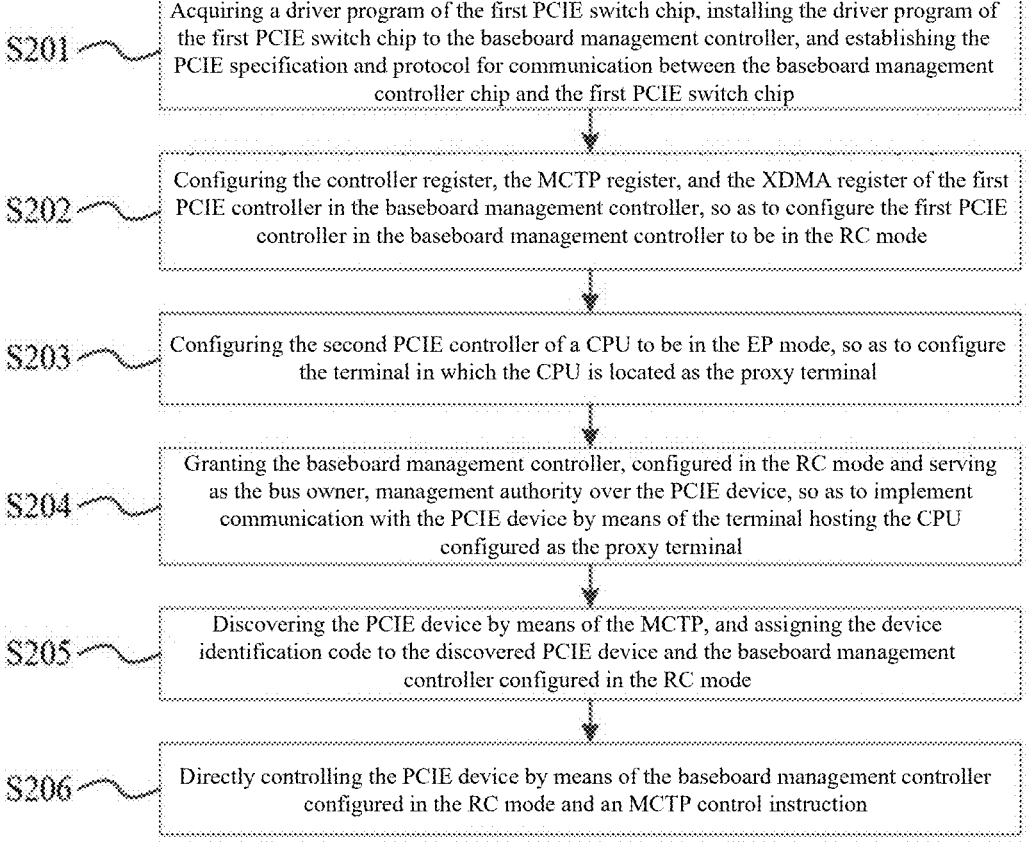

S201 — Acquiring a driver program of the first PCIE switch chip, installing the driver program of the first PCIE switch chip to the baseboard management controller, and establishing the PCIE specification and protocol for communication between the baseboard management controller chip and the first PCIE switch chip S202 — Configuring the controller register, the MCTP register, and the XDMA register of the first PCIE controller in the baseboard management controller, so as to configure the first PCIE controller in the baseboard management controller to be in the RC mode S203 — Configuring the second PCIE controller of a CPU to be in the EP mode, so as to configure the terminal in which the CPU is located as the proxy terminal S204 — Granting the baseboard management controller, configured in the RC mode and serving as the bus owner, management authority over the PCIE device, so as to implement communication with the PCIE device by means of the terminal hosting the CPU configured as the proxy terminal S205 — Discovering the PCIE device by means of the MCTP, and assigning the device identification code to the discovered PCIE device and the baseboard management controller configured in the RC mode S206 — Directly controlling the PCIE device by means of the baseboard management controller configured in the RC mode and an MCTP control instruction

FIG. 4

Device management system

Driver module        Management module

Mode configuration module

FIG. 5

PCIE DEVICE MANAGEMENT ARCHITECTURE, METHOD, AND SYSTEM, DEVICE, AND MEDIUM

CROSS-REFERENCE TO RELATED APPLICATION

This application is the national phase application of International Application No. PCT/CN2024/097603, filed Jun. 5, 2024, which claims priority to Chinese Patent Application No. 202310884018.1, filed on Jul. 19, 2023 in China National Intellectual Property Administration and entitled "PCIE Device Management Architecture, Method, and System, Device, and Medium". The contents of International Application No. PCT/CN2024/097603 and Chinese Patent Application No. 202310884018.1 are each herein incorporated by reference in their entireties.

FIELD

The present application relates to the technical field of servers, in particular to a PCIE device management architecture, method, and system, a device, and a medium.

BACKGROUND

A root complex (RC) is a critical structural component in a peripheral component interconnect express (PCIE) architecture, which is a high-speed serial computer expansion bus standard. Concept of the RC is closely correlated with an X86 system architecture. In fact, a standardized RC specification is defined in the X86 architecture. In other systems, full functionality of RC is not defined by a standard.

An X86-based baseboard management controller (BMC) chip may acquire information of a PCIE device through the RC. However, when an advanced Reduced Instruction Set Computer (RISC) machine (ARM)-based BMC chip want to acquire the information of the PCIE device, it needs to rely on a southbridge chip-platform controller hub (PCH) to capture the information of the PCIE device and transfer the information of the PCIE device in an in-band communication manner to the ARM-based BMC chip. As a result, the ARM-based BMC chip may not directly acquire the information of the PCIE device or directly manage the PCIE device, resulting in poor management efficiency of the ARM-based BMC chip over the PCIE device.

SUMMARY

In an aspect, provided is a PCIE device management architecture, including:

a baseboard management controller, the baseboard management controller being internally provided with a baseboard management controller chip, a first PCIE switch chip, and a first PCIE controller, the baseboard management controller chip being connected with the first PCIE switch chip, and the first PCIE controller being configured in a root complex (RC) mode; and a central processing unit (CPU), the CPU being in communication connection with the baseboard management controller, the CPU being internally provided with a second PCIE controller, the second PCIE controller being configured in an endpoint device (EP) mode, the CPU being connected with a second PCIE switch chip, and the second PCIE switch chip being connected with a plurality of PCIE devices, where the plurality of PCIE devices are controlled directly by the baseboard management controller configured in the RC mode.

In one embodiment, a southbridge chip-platform controller hub is connected between the CPU and the baseboard management controller, and an embedded controller is arranged in the southbridge chip-platform controller hub.

In another aspect, provided is a PCIE device management method, including:

acquiring a driver program of the first PCIE switch chip, installing the driver program of the first PCIE switch chip to the baseboard management controller, and establishing a PCIE specification and protocol for communication between the baseboard management controller chip and the first PCIE switch chip;

configuring the first PCIE controller in the baseboard management controller to be in the RC mode, and configuring the second PCIE controller of the CPU to be in the EP mode; and directly controlling the PCIE devices by means of the baseboard management controller configured in the RC mode.

In one embodiment, the configuring the first PCIE controller in the baseboard management controller to be in the RC mode includes:

configuring a register of the first PCIE controller in the baseboard management controller, so as to configure the first PCIE controller in the baseboard management controller to be in the RC mode.

In one embodiment, the configuring a register in first PCIE controller in the baseboard management controller includes:

configuring a controller register of the first PCIE controller in the baseboard management controller.

In one embodiment, the configuring a register of the first PCIE controller in the baseboard management controller further includes:

configuring a management component transport protocol (MCTP) register of the first PCIE controller in the baseboard management controller.

In one embodiment, the configuring a register of the first PCIE controller in the baseboard management controller further includes:

configuring a Direct Media Architecture memory Access (XDMA) register of the first PCIE controller in the baseboard management controller.

In one embodiment, the configuring the second PCIE controller in the CPU to be in the EP mode includes:

configuring the second PCIE controller of the CPU to be in the EP mode, so as to configure a terminal in which the CPU is located as a proxy terminal.

In one embodiment, the configuring the second PCIE controller of the CPU to be in the EP mode further includes:

making the baseboard management controller configured in the RC mode as a bus owner to acquire a management authority for the PCIE devices, so as to communicate with the PCIE devices by the terminal in which the CPU is located and that is configured as the proxy terminal.

In one embodiment, the directly controlling the PCIE devices by means of the baseboard management controller configured in the RC mode includes:

directly controlling the PCIE devices by means of the baseboard management controller configured in the RC mode and an address operation instruction.

In one embodiment, the directly controlling the PCIE devices by means of the baseboard management controller configured in the RC mode includes:

directly controlling the PCIE devices by means of the baseboard management controller configured in the RC mode and an MCTP control instruction.

In one embodiment, the directly controlling the PCIE devices by means of the baseboard management controller configured in the RC mode includes:

accessing a configuration space of the PCIE devices by means of the baseboard management controller configured in the RC mode; and performing device enable or disable control for the configuration space of the PCIE device, and setting an interrupt mode of the PCIE device.

In one embodiment, the directly controlling the PCIE devices by means of the baseboard management controller configured in the RC mode further includes:

acquiring device information of the PCIE devices by means of the baseboard management controller configured in the RC mode; and storing the device information of the PCIE devices into a memory of the baseboard management controller for display of the device information on a display interface.

In one embodiment, before the directly controlling the PCIE devices by means of the baseboard management controller configured in the RC mode, and an MCTP control instruction, the method further includes:

discovering the PCIE devices by means of an MCTP, and assigning a device identification code to a discovered PCIE device and the baseboard management controller configured in the RC mode.

In one embodiment, the discovering the PCIE devices by means of the MCTP, and assigning a device identification code to a discovered PCIE device and the baseboard management controller configured in the RC mode includes:

sending a 0x0B control request broadcast packet to the PCIE devices, and notifying the device identification code of the baseboard management controller;

receiving a response 0x0B instruction of the PCIE device, and acquiring a PCIE device carrying an undiscovered flag;

sending a 0x0C control request broadcast packet to the PCIE devices, and notifying the device identification code of the baseboard management controller;

receiving a response 0x0C instruction of the PCIE device carrying the undiscovered flag;

sending a 0x01 control request to the PCIE device, and carrying a device identification code for configuring the PCIE device, so as to mark the PCIE device carrying the undiscovered flag with a discovered flag, and assigning the device identification code to the PCIE device; and receiving a PCIE device marked with the discovered flag and a corresponding device identification code.

In one embodiment, before the sending a 0x0B control request broadcast packet to the PCIE devices, and notifying the device identification code of the baseboard management controller, the method further includes:

receiving 0x0D control request sent by the PCIE devices, and acquiring a PCIE device carrying the undiscovered flag; and sending a response 0x0D instruction to the PCIE device carrying the undiscovered flag.

In one embodiment, a PCIE device management method further includes:

acquiring fault information of the PCIE devices by means of a baseboard management controller configured in the RC mode.

In one embodiment, a PCIE device management method further includes:

configuring the first PCIE controller in the baseboard management controller to be in the EP mode, and configuring the second PCIE controller of the CPU to be in the RC mode; and directly controlling the PCIE devices by means of the CPU configured in the RC mode.

In still another aspect, provided is a PCIE device management system, including:

a driver module, configured to acquire a driver program of a first PCIE switch chip, install the driver program of the first PCIE switch chip to a baseboard management controller, and establish a PCIE specification and protocol for communication between a baseboard management controller chip and the first PCIE switch chip;

a mode configuration module, configured to configure a first PCIE controller in the baseboard management controller to be in an RC mode, and configure a second PCIE controller of a CPU to be in an EP mode; and a management module, configured to directly control a PCIE device by means of the baseboard management controller configured in the RC mode.

In still another aspect, provided is a computer device, including a memory, a processor, and a computer-readable instruction stored on the memory and capable of running on the processor, where the processor, when executing the computer-readable instruction, implements the following steps:

acquiring a driver program of a first PCIE switch chip, installing the driver program of the first PCIE switch chip to a baseboard management controller, and establishing a PCIE specification and protocol for communication between a baseboard management controller chip and the first PCIE switch chip;

configuring a first PCIE controller in the baseboard management controller to be in an RC mode, and configuring a second PCIE controller of a CPU to be in an EP mode; and directly controlling a PCIE device by means of the baseboard management controller configured in the RC mode.

In still another aspect, provided is one or more non-transitory computer-readable storage media having a computer-readable instruction stored therein, where the computer-readable instruction, when executed by one or more processors, causes the one or more processors to perform the following steps:

acquiring a driver program of a first PCIE switch chip, installing the driver program of the first PCIE switch chip to a baseboard management controller, and establishing a PCIE specification and protocol for communication between a baseboard management controller chip and the first PCIE switch chip;

configuring the first PCIE controller in the baseboard management controller to be in an RC mode, and configuring the second PCIE controller of a CPU to be in an EP mode; and directly controlling a PCIE device by means of the baseboard management controller configured in the RC mode.

BRIEF DESCRIPTION OF THE DRAWINGS

To describe the technical solutions of the embodiments of the present application more clearly, the accompanying drawings required for describing the embodiments are intro-duced briefly below. Apparently, the accompanying draw-ings in the following description show some embodiments of the present application, and a person of ordinary skill in the art may still derive other accompanying drawings from these accompanying drawings without creative efforts.

FIG. 4 is a second flowchart of the PCIE device manage-ment method provided by one or more embodiments of the present application;

FIG. 5 is a structural diagram of a PCIE device manage-ment system provided by one or more embodiments of the present application.

DETAILED DESCRIPTION

To make the objectives, technical solutions, and advan-tages of the present application clearer, the following further describes the present application in detail with reference to the accompanying drawings and the embodiments. It is to be understood that the embodiments described herein are used to explain the present application, and not to limit the present application.

Figure 2:
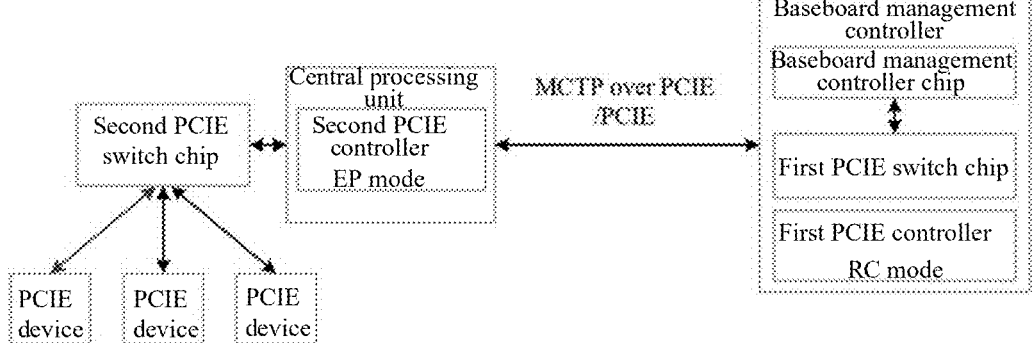
FIG. 2 is a second architecture diagram of the PCIE device management architecture provided by one or more embodiments of the present application.

In some embodiments, referring to FIG. 2, FIG. 2 is a second architecture diagram of a peripheral component interconnect express (PCIE) device management architec-ture provided by an embodiment of the present application.

A PCIE device management architecture includes:

a baseboard management controller, the baseboard man-agement controller being internally provided with a baseboard management controller chip, a first PCIE switch chip, and a first PCIE controller, the baseboard management controller chip being connected with the first PCIE switch chip, and the first PCIE controller being configured in a root complex (RC) mode; and a central processing unit (CPU), the CPU being in com-munication connection with the baseboard manage-ment controller, the CPU being internally provided with a second PCIE controller, the second PCIE con-troller being configured in an endpoint device (EP) mode, the CPU being connected with a second PCIE switch chip, and the second PCIE switch chip being connected with a plurality of PCIE devices, where the PCIE devices are controlled directly by the baseboard management controller configured in the RC mode.

In the diagram of the PCIE device management architec-ture shown in FIG. 2, the baseboard management controller is connected with the CPU, the CPU is connected with the second PCIE switch chip, and the second PCIE switch chip is connected with a plurality of PCIE devices. In a PCIE device management architecture of an X86 architecture in the prior art, the CPU is a host terminal (a bus owner), the CPU has a standard RC specification and protocol, may fulfill all functions of the RC, and has an authority of accessing the PCIE devices, while the baseboard manage-ment controller serving as a slave terminal does not have the authority of actively acquiring the information of the PCIE devices, may capture the information of the PCIE devices by means of an embedded controller, and then send the infor-mation of the PCIE devices to the baseboard management controller in an in-band communication manner. As a result, the baseboard management controller may not directly acquire the information of the PCIE devices, and may not directly manage the PCIE devices, thereby leading to poor management efficiency of the baseboard management con-troller of an advanced Reduced Instruction Set Computer (RISC) machine (ARM) architecture over the PCIE devices.

In order to improve the management capacity of the base-board management controller of the ARM architecture over the PCIE devices, in the present application, the first PCIE switch chip is added in the baseboard management control-ler, the first PCIE switch chip is connected with the base-board management controller chip, a PCIE communication protocol is established between the first PCIE switch chip and the baseboard management controller chip, and then an operation mode of the first PCIE controller is set in an RC mode, i.e. a host terminal (bus owner). The baseboard management controller is connected with the CPU, the second PCIE controller is arranged in the CPU, and the second PCIE controller in the CPU is set to the EP mode, i.e. a slave terminal. The CPU is connected with the second PCIE switch chip, which is configured to extend a plurality of PCIE devices. Since the host terminal possesses the active authority to operate the slave terminal, the baseboard man-agement controller, configured in the RC mode and serving as the host terminal, is endowed with the authority to acquire the information of the PCIE devices, and establishes the PCIE communication protocol. Therefore, the baseboard management controller, serving as the RC, has the manage-ment authority over the PCIE devices, and the baseboard management controller may directly acquire the information of the PCIE devices such as a PCIE device ID, a vendor ID, a subsystem ID, and a subsystem vendor ID. Moreover, the baseboard management controller, serving as the actual bus owner, directly accesses a configuration space of the PCIE devices to acquire base address register (BAR) information of the PCIE devices. The information is configured to determine an address space of the PCIE devices, to facilitate memory mapping and access in the system, thereby imple-menting direct control of the baseboard management con-troller over the PCIE devices.

In the PCIE device management architecture provided in the present application, the first PCIE switch chip is added in the baseboard management controller. The baseboard management controller chip is in communication connection with the first PCIE switch chip, and the first PCIE controller is configured in the RC mode. The baseboard management controller obtains the management authority over the PCIE devices, and may directly acquire the information of the PCIE devices and directly control the PCIE devices, thereby improving the management efficiency of the baseboard management controller over the PCIE devices. Furthermore, since the embedded controller may operate after the server is completely started, and the baseboard management con-troller may acquire the information of the PCIE devices by means of the embedded controller, time for acquiring the information of the PCIE devices by means of the embedded controller is relatively long. However, the baseboard man-agement controller provided in the present application is used as the RC to obtain the management authority over the PCIE devices, and may acquire the information of the PCIE devices without using the embedded controller, thereby increasing the speed of acquiring the information of the PCIE devices by the baseboard management controller.

In one or more implementations, a southbridge chip-platform controller hub is connected between the CPU and the baseboard management controller, and an embedded controller is arranged in the southbridge chip-platform controller hub.

Figure 1:
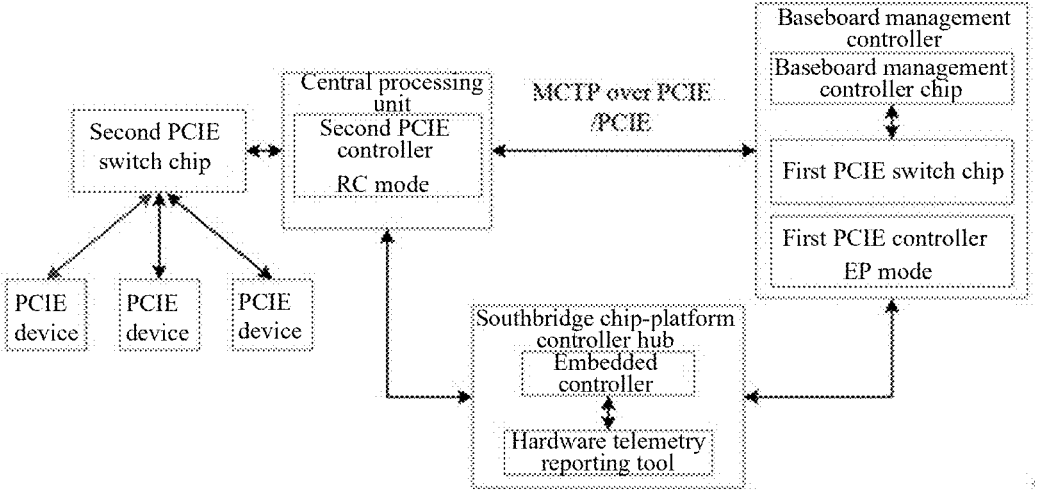
FIG. 1 is a first architecture diagram of a peripheral component interconnect express (PCIE) device management architecture provided by one or more embodiments of the present application.

As shown in FIG. 1, the PCIE device management architecture further includes a southbridge chip-platform controller hub. The southbridge chip-platform controller hub is connected between the CPU and the baseboard management controller, and a management engine (ME), i.e. the embedded controller, is arranged in the southbridge chip-platform controller hub. Both the first PCIE controller and the second PCIE controller have the EP mode and the RC mode. Operation modes of the first PCIE controller and the second PCIE controller are configured according to an actual need. For example, the first PCIE controller in the baseboard management controller is configured in the EP mode, i.e. a slave terminal, and the second PCIE controller in the CPU is configured in the RC mode, i.e. a host terminal (bus owner). At this time, the CPU acquires the management authority over the PCIE devices, and the baseboard management controller may capture the information of the PCIE devices by means of the embedded controller, and the information of the PCIE devices is sent to the baseboard management controller. In addition, the embedded controller is further connected with a platform monitoring technology (PMT, a hardware telemetry reporting tool). The PMT is a platform monitoring technology, and may be used inside an organization and a data center to monitor the performance and collect data on hardware. Therefore, a system administrator may work more easily, and may acquire all data in Extensive Markup Language (XML) format.

In the PCIE device management architecture provided in the present application, both the CPU and the baseboard management controller have the PCIE controller, and have the RC mode and the EP mode, whereby the CPU and the baseboard management controller in the present application may be configured in different operation modes according to actual requirements, thereby improving the universality of the PCIE device management architecture.

Figure 3:
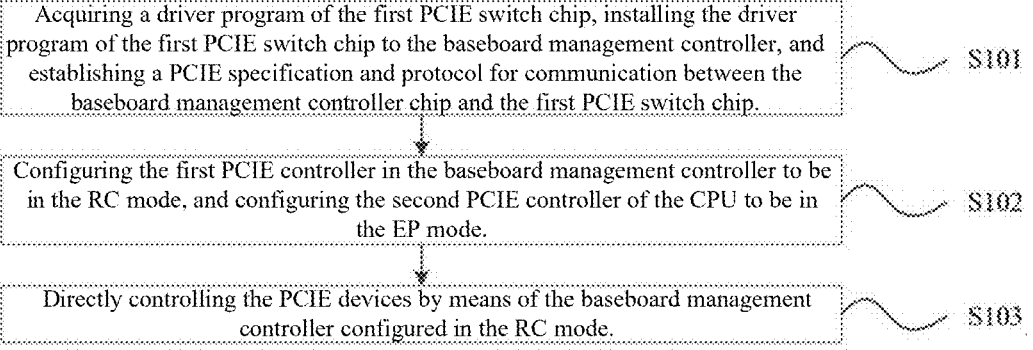
FIG. 3 is a first flowchart of a PCIE device management method provided by one or more embodiments of the present application.

In some embodiments, referring to FIG. 3, FIG. 3 is a first flowchart of a PCIE device management method provided by an embodiment of the present application.

A PCIE device management method includes the following steps:

S101: acquiring a driver program of the first PCIE switch chip, installing the driver program of the first PCIE switch chip to the baseboard management controller, and establishing a PCIE specification and protocol for communication between the baseboard management controller chip and the first PCIE switch chip.

In some embodiments, the first PCIE switch chip is added in the baseboard management controller, whereby the driver program of the first PCIE switch chip needs to be acquired first, and then the driver program of the first PCIE switch chip is installed to the baseboard management controller, to allow the first switch chip to operate normally on the baseboard management controller. Furthermore, the driver program of the first PCIE switch chip may establish a communication between the baseboard management control chip and the first PCIE switch chip, i.e. establishing the PCIE specification and protocol for communication between the baseboard management controller chip and the first PCIE switch chip, whereby PCIE communication may be implemented between the baseboard management controller chip and the first PCIE switch chip.

S102: configuring the first PCIE controller in the baseboard management controller to be in the RC mode, and configuring the second PCIE controller of the CPU to be in the EP mode.

In some embodiments, after the PCIE communication is implemented between the baseboard management controller and the first PCIE switch chip, the first PCIE controller in the baseboard management controller is configured in the RC mode, i.e. the host terminal (bus owner). Then the second PCIE controller of the CPU is configured in the EP mode, i.e. a slave terminal, whereby the PCIE devices are controlled directly by the baseboard management controller configured in the RC mode.

S103: directly controlling the PCIE devices by means of the baseboard management controller configured in the RC mode.

In some embodiments, since the host terminal has proactive operational authority over the slave terminal, the baseboard management controller, configured in the RC mode and serving as the host terminal, is granted the authority to acquire the information of the PCIE devices, and establishes a PCIE communication mechanism. Therefore, the baseboard management controller, serving as an RC, has management authority over the PCIE devices, and the baseboard management controller may directly acquire the device information of the PCIE devices and directly control the PCIE devices.

In the PCIE device management method provided in the present application, the PCIE communication protocol is established between the baseboard management controller chip and the first PCIE switch chip, and the first PCIE controller is configured in the RC mode to obtain the management authority over the PCIE devices. The device information of the PCIE devices may be directly acquired and the PCIE devices are be controlled directly, thereby improving the management efficiency of the baseboard management controller over the PCIE devices. Moreover, the baseboard management controller provided in the present application is used as the RC to obtain the management authority over the PCIE devices. The information of the PCIE devices may be acquired without using the embedded controller, and the speed of obtaining the information of the PCIE devices by the baseboard management controller is increased.

In one or more implementations, the configuring the first PCIE controller in the baseboard management controller to be in the RC mode includes:

configuring a register of the first PCIE controller in the baseboard management controller, so as to configure the first PCIE controller in the baseboard management controller to be in the RC mode.

In some embodiments, to configure the first PCIE controller in the baseboard management controller to be in the RC mode, it is necessary to configure the register of the first PCIE controller. By modifying parameters of the register of the first PCIE controller, the first PCIE controller in the baseboard management controller is configured in the RC mode.

By configuring the register of the first PCIE controller, the first PCIE controller in the baseboard management controller is configured in the RC mode. The management authority over the PCIE devices is obtained by the baseboard management controller configured in the RC mode. The device information of the PCIE devices may be obtained directly, and the PCIE devices may be controlled directly, thereby improving the management efficiency of the baseboard management controller over the PCIE devices.

In one or more implementations, the configuring a register of the first PCIE controller in the baseboard management controller includes:

configuring a controller register of the first PCIE controller in the baseboard management controller.

In some embodiments, the controller register of the first PCIE controller in the baseboard management controller is configured, that is, the controller register of the first PCIE controller in the baseboard management controller is configured to configure a root port. Communication between the PCIE devices and the baseboard management controller is implemented by means of the root port. That is, the controller register of the first PCIE controller of the baseboard management controller is initialized, and PEHR30 (a miscellaneous control 30h register) is configured so as to configure the root port.

In one or more implementations, the configuring a register of the first PCIE controller in the baseboard management controller further includes:

configuring a management component transport protocol (MCTP) register of the first PCIE controller in the baseboard management controller.

In some embodiments, the MCTP register of the first PCIE controller in the baseboard management controller is configured, that is, communication protocols related to the MCTP are configured to implement the MCTP communication. For example, configure a transmission command address (MCTP04: TX Command Address), a receiving buffer address (MCTP08: RX Buffer Address), and MCTP14: MCTP device identification code (EID), or the like.

In one or more implementations, the configuring a register of the first PCIE controller in the baseboard management controller includes:

configuring a Xing Direct Architecture memory Access (XDMA) register of the first PCIE controller in the baseboard management controller.

In some embodiments, the XDMA register of the first PCIE controller in the baseboard management controller is configured by setting the direct memory access (DMA) parameters. A DMA controller may directly copy data from an IO register of the device to a main memory without going through the CPU, and a notification is issued to the CPU after the data transmission is completed. In this way, the CPU may focus on other tasks, thereby improving the data transmission efficiency.

In one or more implementations, the configuring the second PCIE controller of the CPU to be in the EP mode includes:

configuring the second PCIE controller of the CPU to be in the EP mode, so as to configure a terminal in which the CPU is located as a proxy terminal.

In some embodiments, the second PCIE controller of the CPU is configured in the EP mode, that is, the CPU, serving as a slave terminal of the baseboard management controller, is controlled by the baseboard management controller, whereby the baseboard management controller obtains the management authority over the PCIE devices. The terminal in which the CPU is located is configured as the proxy terminal, that is the host terminal may be set as an RC proxy, i.e. having a proxy function, whereby the baseboard management controller, as an actual bus owner, may directly access a configuration space of the PCIE devices.

The terminal in which the CPU is located is configured as the proxy terminal, thereby allowing the baseboard management controller to function as the actual bus owner to directly access the configuration space of the PCIE devices. As a result, the management efficiency of the baseboard management controller over the PCIE devices is improved, and the speed of acquiring the information of the PCIE devices by the baseboard management controller is increased.

In one or more implementations, after the configuring the second PCIE controller of the CPU to be in the EP mode, the method further includes:

making the baseboard management controller configured in the RC mode as a bus owner to acquire a management authority for the PCIE devices, so as to communicate with the PCIE devices by the terminal in which the CPU is located and that is configured as the proxy terminal.

In some embodiments, the first PCIE controller in the baseboard management controller is configured in the RC mode, i.e. the host terminal, that is, the baseboard management controller configured in the RC mode is used as the bus owner. In some embodiments, the baseboard management controller configured in the RC mode is granted the management authority over the PCIE devices to implement communication with the PCIE devices by means of the terminal hosting the CPU configured as the proxy terminal, thereby managing the PCIE devices.

The baseboard management controller, as the actual bus owner, is directly communicated with the PCIE devices by means of the terminal in which the CPU configured as the proxy terminal is located, and the bus owner may access the configuration space of the PCIE devices, thereby improving the management efficiency of the baseboard management controller over the PCIE devices, and increasing the speed of acquiring the information of the PCIE devices by the baseboard management controller.

In one or more implementations, the directly controlling PCIE devices by means of the baseboard management controller configured in the RC mode includes:

directly controlling PCIE devices by means of the baseboard management controller configured in the RC mode and an address operation instruction.

In some embodiments, the baseboard management controller, configured in the RC mode and serving as the bus owner, may manage the PCIE devices in a management manner as follows: the baseboard management controller configured in the RC mode manages the PCIE devices by means of the address operation instruction, i.e. PCIE between CPU and BMC in FIG. 1 and FIG. 2. Since the PCIE belongs to a physical layer protocol, a transaction layer packet (TLP) provided by a driver by means of an address operation is used to be sent and received directly. The baseboard management controller configured in the RC mode directly controls the PCIE devices by means of the address operation instruction.

In one or more implementations, the directly controlling the PCIE devices by means of the baseboard management controller configured in the RC mode includes:

accessing a configuration space of the PCIE devices by means of the baseboard management controller configured in the RC mode.

In some embodiments, managing the PCIE devices by means of the baseboard management controller configured in the RC mode, that is, accessing the configuration space of the PCIE devices by means of the baseboard management controller configured in the RC mode, so as to perform relevant configuration on the configuration space of the PCIE devices or acquire the device information of the PCIE devices.

Device enable or disable control is performed for the configuration space of the PCIE devices, and an interrupt mode of the PCIE devices is set.

In some embodiments, accessing the configuration space of the PCIE devices by means of the baseboard management controller configured in the RC mode may be implemented by executing operations of enabling the PCIE devices (enable control), disabling the PCIE devices (disable control), or setting a terminal mode of the PCIE devices.

The baseboard management controller, as an actual bus owner, may access the configuration space of the PCIE devices, thereby improving the management efficiency of the baseboard management controller over the PCIE devices.

In one or more implementations, the directly controlling the PCIE devices by means of the baseboard management controller configured in the RC mode further includes:

acquiring device information of the PCIE devices by means of the baseboard management controller configured in the RC mode.

In some embodiments, the device information of the PCIE devices is stored in a memory of the baseboard management controller for display of the device information on a display interface. The received information of the PCIE devices may be displayed in a web or command manner or other implementable manners.

The device information of the PCIE devices may be acquired by the baseboard management controller configured in the RC mode, and then the device information of the PCIE devices is stored into the memory of the baseboard management controller for the display interface to display, whereby the operation personnel knows relevant PCIE device information in time, so as to diagnose and remove faults of the PCIE devices, thereby improving the reliability and stability of the PCIE devices.

In one or more implementations, the directly controlling PCIE devices by means of the baseboard management controller configured in the RC mode includes:

directly controlling the PCIE devices by means of the baseboard management controller configured in the RC mode and an MCTP control instruction.

In some embodiments, the baseboard management controller configured in the RC mode manages the PCIE devices by means of the address operation instruction, and may further directly control the PCIE devices by means of the MCTP control instruction, i.e. MTCP over PCIE in FIG. 1 and FIG. 2. In a manner for managing the PCIE device by means of the address operation instruction, it is necessary to parse the received and sent information. In a manner for managing the PCIE devices by means of the MCTP control instruction, the MCTP is a dedicated protocol and does not require the analysis operation, and the operation may be performed by means of an MCTP control instruction. Since all PCIE devices used at present support the MCTP, the management efficiency of the baseboard management controller over the PCIE devices may be improved by adopting the management method of the MCTP control command. The technical solution of the address operation instruction and the technical solution of the MCTP control instruction may be alternative according to actual requirements.

By adopting the management manner of the MCTP control instruction, the management efficiency of the baseboard management controller over the PCIE devices may be improved.

In one or more implementations, before the directly controlling PCIE devices by means of the baseboard management controller configured in the RC mode and the MCTP control instruction, the method further includes:

discovering the PCIE device by means of an MCTP, and assigning a device identification code to a discovered PCIE device and the baseboard management controller configured in the RC mode.

In some embodiments, before the PCIE device is managed by means of the baseboard management controller configured in the RC mode and the MCTP control instruction, it is necessary to assign the device identification code (EID) to the baseboard management controller and the PCIE device, so as to determine a source EID and a target EID, thereby implementing the communication and management of the baseboard management controller over the PCIE devices.

In one or more implementations, the discovering the PCIE devices by means of an MCTP, and assigning a device identification code to a discovered PCIE device and the baseboard management controller configured in the RC mode includes:

sending a 0x0B control request broadcast packet to the PCIE devices, and notifying the device identification code of the baseboard management controller;

receiving a response 0x0B instruction of the PCIE device, and acquiring a PCIE device carrying an undiscovered flag;

sending a 0x0C control request broadcast packet to the PCIE devices, and notifying the device identification code of the baseboard management controller;

receiving a response 0x0C instruction of the PCIE device carrying the undiscovered flag;

sending a 0x01 control request to the PCIE device, and carrying the device identification code for configuring the PCIE device, so as to mark the PCIE device carrying the undiscovered flag with a discovered flag, and assigning the device identification code to the PCIE device; and receiving a PCIE device marked with the discovered flag and the corresponding device identification code.

In some embodiments, a process of assigning an identification code to the PCIE device and the baseboard management controller according to the MCTP is as follows: a bus owner (the baseboard management controller configured in the RC mode) sends the 0x0B control request broadcast packet to the PCIE devices, and notifies the device identification code of the bus owner. The bus owner receives the response 0x0B instruction of the PCIE device and acquires the PCIE device carrying the undiscovered flag. The bus owner sends the 0x0C control request broadcast packet to the PCIE devices, and notifies the device identification code of the bus owner. The bus owner receives the response 0x0C instruction of the PCIE device carrying the undiscovered flag. The bus owner sends the 0x01 control request to the PCIE devices and carries the device identification code for configuring the PCIE device. The PCIE device carrying the undiscovered flag is marked with a discovered flag and assigned with corresponding device identification code. The bus owner receives a PCIE device marked with the discovered flag and the corresponding device identification code.

The EID is assigned to the baseboard management controller and the PCIE device, so as to determine the source EID and the target EID, thereby implementing the management of the baseboard management controller over the PCIE devices, and improving the management efficiency.

In one or more implementations, before the sending a 0x0B control request broadcast packet to the PCIE devices, and notifying the device identification code of the baseboard management controller, the method further includes:

receiving a 0x0D control request sent by the PCIE devices, and acquiring the PCIE device carrying an undiscovered flag; and sending a response 0x0D instruction to the PCIE device carrying the undiscovered flag.

In some embodiments, in a process of assigning the device identification code to the PCIE device, some PCIE devices need to actively send a control request to the bus owner, whereby for these PCIE devices, before the bus owner sends the 0x0B instruction, it is necessary to receive a 0x0D control request sent by the PCIE devices and acquire the PCIE devices carrying the undiscovered flag. And then a response 0x0D instruction is sent to the PCIE devices carrying the undiscovered flag, whereby the bus owner continues the operation of sending the 0x0B instruction to assign the device identification code to the baseboard management controller and the PCIE devices.

In one or more implementations, a PCIE device management method further includes:

acquiring fault information of the PCIE devices by means of the baseboard management controller configured in the RC mode.

In some embodiments, since the baseboard management controller, configured in the RC mode and serving as the bus owner, is granted management authority over the PCIE devices by means of the CPU configured as the proxy terminal, the baseboard management controller configured in the RC mode may acquire the fault information of the PCIE devices directly by means of the CPU configured as the proxy terminal without waiting for the complete startup of the server and the normal operation of the embedded controller.

The baseboard management controller configured in the RC mode acquires the fault information of the PCIE devices, thereby reducing the time for acquiring the fault information, improving the fault information acquisition efficiency, and timely notifying the maintenance personnel of maintaining the PCIE device that is in a fault state.

In one or more implementations, a PCIE device management method further includes:

configuring a first PCIE controller in the baseboard management controller to be in the EP mode, and configuring a second PCIE controller of a CPU to be in the RC mode.

In some embodiments, both the first PCIE controller and the second PCIE controller have the EP mode and the RC mode. Operation modes of the first and second PCIE controllers are configured according to an actual need. For example, the first PCIE controller in the baseboard management controller is configured in the EP mode, i.e. a slave terminal; and the second PCIE controller in the CPU is configured in the RC mode, i.e. a host terminal (a bus owner). In this configuration, the CPU obtains the management authority over a PCIE device, and the baseboard management controller may not actively acquire the device information of the PCIE device, and may not access a configuration space of the PCIE device either.

Directly controlling the PCIE devices by means of the CPU configured in the RC mode.

In some embodiments, the CPU obtains the management authority over the PCIE device, the baseboard management controller may capture the device information of the PCIE device by means of an embedded controller, and then the device information of the PCIE device is sent to the baseboard management controller.

In some embodiments, referring to FIG. 4, FIG. 4 is a second flowchart of a PCIE device management method provided by an embodiment of the present application. In the method shown in FIG. 4, for the content that is the same as or similar to that in the method shown in FIG. 3, refer to the descriptions in the method shown in FIG. 3. Details are not described herein again.

S201: acquiring a driver program of the first PCIE switch chip, installing the driver program of the first PCIE switch chip to the baseboard management controller, and establishing the PCIE specification and protocol for communication between the baseboard management controller chip and the first PCIE switch chip.

The first PCIE switch chip is added in the baseboard management controller, whereby the driver program of the first PCIE switch chip needs to be acquired first, and then the driver program of the first PCIE switch chip is installed to the baseboard management controller, to allow the first switch chip to operate normally on the baseboard management controller. Furthermore, the driver program of the first PCIE switch chip may establish a communication between the baseboard management control chip and the first PCIE switch chip, i.e. establishing the PCIE specification and protocol for communication between the baseboard management controller chip and the first PCIE switch chip, whereby PCIE communication may be implemented between the baseboard management controller chip and the first PCIE switch chip.

S202: configuring the controller register, the MCTP register, and the XDMA register of the first PCIE controller in the baseboard management controller, so as to configure the first PCIE controller in the baseboard management controller to be in the RC mode.

The controller register of the first PCIE controller in the baseboard management controller is configured so as to configure a root port, and the PCIE device is communicated with the baseboard management controller by means of the root port. Communication protocols related to the MCTP are configured to achieve MCTP communication. And direct memory access (DMA) is configured.

S203: configuring the second PCIE controller of a CPU to be in the EP mode, so as to configure the terminal in which the CPU is located as the proxy terminal.

The second PCIE controller of the CPU is configured in the EP mode, that is, the CPU, serving as the slave terminal of the baseboard management controller, is controlled by the baseboard management controller, whereby the baseboard management controller obtains the management authority over the PCIE device. The terminal in which the CPU is located is configured as the proxy terminal, that is, the host terminal may be set as the RC proxy, i.e. having the proxy function, whereby the baseboard management controller, as the actual bus owner, may directly access the configuration space of the PCIE device.

S204: granting the baseboard management controller, configured in the RC mode and serving as the bus owner, management authority over the PCIE device, so as to implement communication with the PCIE device by means of the terminal hosting the CPU configured as the proxy terminal.

The first PCIE controller in the baseboard management controller is configured in the RC mode, i.e. the host terminal, that is, the baseboard management controller configured in the RC mode is used as the bus owner. In some embodiments, the baseboard management controller configured in the RC mode is granted the management authority over the PCIE device to implement communication with the PCIE devices by means of the terminal hosting the CPU configured as the proxy terminal, thereby managing the PCIE device.

S205: discovering the PCIE device by means of the MCTP, and assigning the device identification code to the discovered PCIE device and the baseboard management controller configured in the RC mode.

Before the PCIE device is managed by means of the baseboard management controller configured in the RC mode and the MCTP control instruction, it is necessary to assign the device identification code (EID) to the baseboard management controller and the PCIE device, so as to determine the source EID and the target EID, thereby implementing the communication and management of the baseboard management controller over the PCIE device.

S206: directly controlling the PCIE device by means of the baseboard management controller configured in the RC mode and an MCTP control instruction.

Managing the PCIE device by means of the baseboard management controller configured in the RC mode and the MCTP control instruction is accessing the configuration space of the PCIE device by means of the baseboard management controller configured in the RC mode and the MCTP control instruction, so as to perform relevant configuration on the configuration space of the PCIE device or acquire the device information of the PCIE device.

It should be understood that although each step in the flowcharts of FIG. 3 to FIG. 4 is shown by the sequence as indicated by the arrow, these steps are not necessarily executed in sequence as indicated by the arrow. Unless explicitly stated in the description, the execution of these operations is not strictly limited in sequence, and these operations may be executed in other sequences. Moreover, at least some steps in FIG. 3 to FIG. 4 may include a plurality of sub-steps or phases, which are not necessarily executed at the same time, but may be executed at different moments, and the execution sequence of these sub-steps or phases is not necessarily sequential, but may be alternately executed with other steps or at least some sub-steps or phases of other steps.

In some embodiments, referring to FIG. 5, FIG. 5 is a structural diagram of a PCIE device management system provided by an embodiment of the present application.

The PCIE device management system in the present embodiment includes:

a driver module, configured to acquire a driver program of a first PCIE switch chip, install the driver program of the first PCIE switch chip to a baseboard management controller, and establish a PCIE specification and protocol for communication between a baseboard management controller chip and the first PCIE switch chip, where the first PCIE switch chip is added in the baseboard management controller, whereby the driver program of the first PCIE switch chip needs to be acquired first, and then the driver program of the first PCIE switch chip is installed to the baseboard management controller by means of the driver module, to allow the first switch chip to operate normally on the baseboard management controller. Furthermore, the driver program of the first PCIE switch chip may establish a communication between the baseboard management control chip and the first PCIE switch chip, i.e. establishing the PCIE specification and protocol for communication between the baseboard management controller chip and the first PCIE switch chip, whereby PCIE communication may be implemented between the baseboard management controller chip and the first PCIE switch chip;

a mode configuration module, configured to configure the first PCIE controller in the baseboard management controller to be in an RC mode, and configure a second PCIE controller of a CPU to be in an EP mode, where after PCIE communication is implemented between the baseboard management controller and the first PCIE switch chip, the first PCIE controller in the baseboard management controller is configured in the RC mode by means of the mode configuration module, i.e. a host terminal (bus owner). Then the second PCIE controller of the CPU is configured in the EP mode, i.e. a slave terminal, whereby the PCIE device is managed by the baseboard management controller configured in the RC mode; and a management module, configured to directly control a PCIE device by means of the baseboard management controller configured in the RC mode.

Since the host terminal has proactive operational authority over the slave terminal, the baseboard management controller, configured in the RC mode and serving as the host terminal, is granted the authority to acquire the information of the PCIE device, and establishes a PCIE communication mechanism. Therefore, the baseboard management controller, serving as an RC, has management authority over the PCIE device, and the baseboard management controller may directly acquire the device information of the PCIE device and directly control the PCIE device.

Regarding the limitation to the PCIE device management system, refer to the limitation to the method described above, which is not repeated herein. Each module in the foregoing PCIE device management system may be implemented entirely or partially through software, hardware, or a combination thereof. The foregoing modules may be embedded to or may be independent from a processor in a computer device in a hardware form, or may be stored in a memory in the computer device in a software form, so as to be invoked by the processor to execute the operations corresponding to each module.

In some embodiments, provided is a computer device, which includes a memory, a processor, and a computer-readable instruction stored on the memory and capable of running on the processor, where the processor, when executing the computer-readable instruction, implements the steps of the PCIE device management method.

Figure 6:
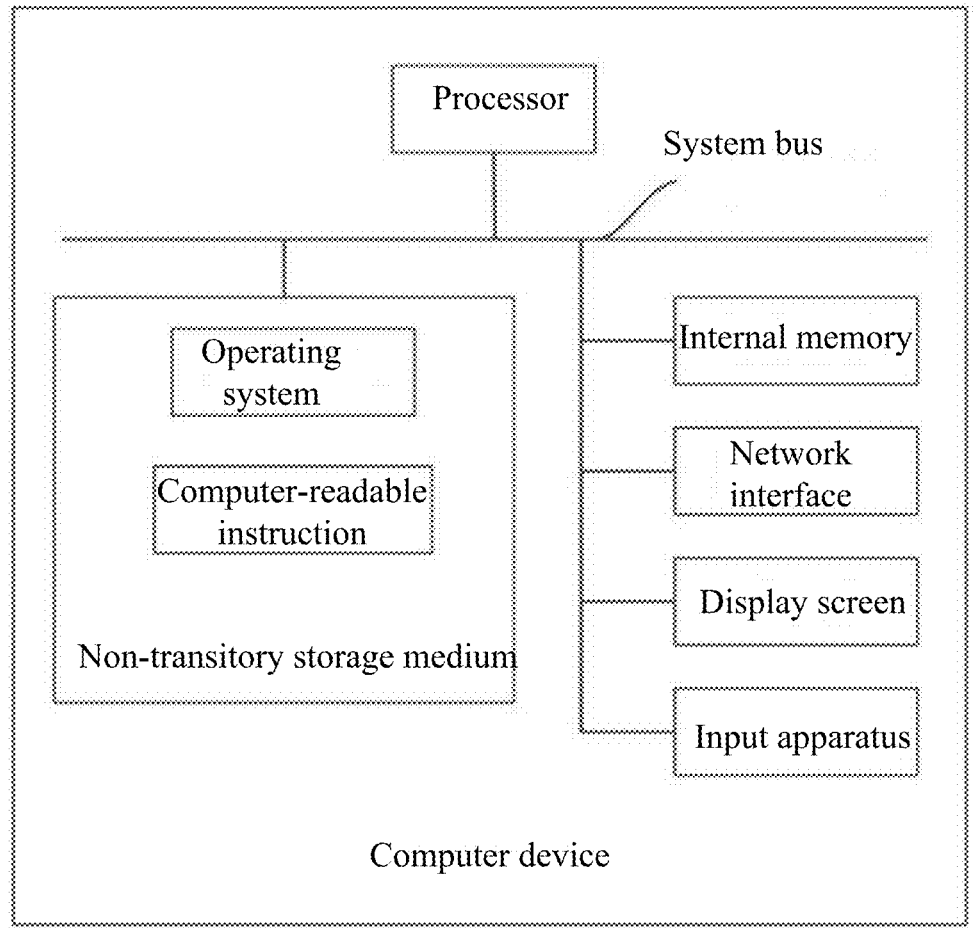
FIG. 6 is a structural diagram of a computer device provided by one or more embodiments of the present application.

The computer device may be a terminal, and an internal structure diagram thereof may be as shown in FIG. 6. The computer device includes a processor, a memory, a network interface, a display screen, and an input apparatus which are connected by means of a system bus. The processor of the computer device is configured to provide computation and control ability. The memory of the computer device includes a non-transitory storage medium and an internal memory. The non-transitory storage medium stores an operating system and a computer-readable instruction. The internal memory provides an environment for running the operating system and the computer-readable instruction in the non-transitory storage medium. The network interface of the computer device is configured to communicate with an external terminal by means of network connection. The computer-readable instruction, when executed by the processor, implements a PCIE device management method. The display screen of the computer device may be a liquid crystal display screen or an e-ink display screen. The input apparatus of the computer device may be a touch layer covering the display screen, or may be a key, a trackball, or a touch-pad disposed on a housing of the computer device, or may be an external keyboard, touch-pad, a mouse or the like.

A person skilled in the art may understand that, structures shown in FIG. 6 are merely block diagrams of a partial structure related to a solution in this application, and do not constitute a limitation to the computer device to which the solution in the application is applied. In some embodiments, the computer device may include more components or fewer components than those shown in the figure, or some components may be combined, or a different component deployment may be used.

In one or more implementations, provided is a computer device, which includes a memory, a processor, and a computer-readable instruction stored on the memory and capable of running on the processor, where the processor, when executing the computer-readable instruction, implements the following steps:

acquiring a driver program of a first PCIE switch chip, installing the driver program of the first PCIE switch chip to a baseboard management controller, and establishing a PCIE specification and protocol for communication between a baseboard management controller chip and the first PCIE switch chip;

configuring a first PCIE controller in the baseboard management controller to be in an RC mode, and configuring a second PCIE controller of a CPU to be in an EP mode; and directly controlling a PCIE device by means of the baseboard management controller configured in the RC mode.

In some embodiments, provided is a computer-readable storage medium having a computer-readable instruction stored thereon, where the computer-readable instruction, when executed by a processor, implements the following step:

acquiring a driver program of a first PCIE switch chip, installing the driver program of the first PCIE switch chip to a baseboard management controller, and establishing a PCIE specification and protocol for communication between a baseboard management controller chip and the first PCIE switch chip;

configuring a first PCIE controller in the baseboard management controller to be in an RC mode, and configuring a second PCIE controller of a CPU to be in an EP mode; and directly controlling a PCIE device by means of the baseboard management controller configured in the RC mode.

A person of ordinary skill in the art may understand that all or some of procedures of the method in the foregoing embodiments may be implemented by a computer-readable instruction instructing relevant hardware. The computer-readable instruction may be stored in a non-transitory computer-readable storage medium. The computer-readable instruction, when executed, may include the procedures of each foregoing method embodiment. Any reference to memories, storage, database or other media used in the embodiments provided in the present application may include non-transitory and/or transitory memory. The non-transitory memory may include a read only memory (ROM), a programmable ROM (PROM), an electronic programmable ROM (EPROM), and an electronic erasable programmable ROM (EEPROM) or flash memory. The transitory memory may include a random-access memory (RAM) and/or external cache memory. As for illustration rather than limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchronous link DRAM (SLDRAM), memory bus (Rambus) direct RAM (RDRAM) and direct memory bus dynamic RAM (DRDRAM), and memory bus dynamic RAM (RDRAM), etc.

Technical features of the foregoing embodiments may be randomly combined. To make description concise, not all possible combinations of the technical features in the foregoing embodiments are described. However, the combinations of these technical features shall be considered as falling within the scope recorded by the present specification provided that no conflict exists.

The foregoing embodiments only describe several implementations of the present application, which are described specifically and in detail, but may not be construed as a limitation to the patent scope of the present application. It is to be noted that for a person of ordinary skill in the art, several transformations and improvements may be made without departing from the idea of the present application. These transformations and improvements belong to the protection scope of the present application. Therefore, the protection scope of the patent of the present application shall be subject to the appended claims.

The invention claimed is:

1. A peripheral component interconnect express (PCIE) device management architecture, comprising:

a baseboard management controller, the baseboard management controller being internally provided with a baseboard management controller chip, a first PCIE switch chip, and a first PCIE controller, the baseboard management controller chip being connected with the first PCIE switch chip, and the first PCIE controller being configured in a Root Complex (RC) mode; and a central processing unit (CPU), the CPU being in communication connection with the baseboard management controller, the CPU being internally provided with a second PCIE controller, the second PCIE controller being configured in an endpoint device (EP) mode, the CPU being connected with a second PCIE switch chip, and the second PCIE switch chip being connected with a plurality of PCIE devices, wherein the plurality of PCIE devices are controlled directly by means of the baseboard management controller configured in the RC mode and an MCTP control instruction;

wherein before the plurality of PCIE devices are controlled directly by means of the baseboard management controller configured in the RC mode and the MCTP control instruction, the plurality of PCIE devices are discovered by means of an MCTP protocol and assigned a device identification code to a discovered PCIE device and the baseboard management controller configured in the RC mode by the baseboard management controller, in the RC mode, being configured to:

send a 0x0B control request broadcast packet to the plurality of PCIE devices, and notify the device identification code of the baseboard management controller;

receive a response 0x0B instruction of a PCIE device carrying an undiscovered flag, and acquire the PCIE device carrying the undiscovered flag;

send a 0x0C control request broadcast packet to the plurality of PCIE devices, and notify the device identification code of the baseboard management controller;

receive a response 0x0C instruction of the PCIE device carrying the undiscovered flag;

send a 0x01 control request to the PCIE device carrying the undiscovered flag, and carrying the device identification code for configuring the PCIE device, wherein the PCIE device carrying the undiscovered flag is marked with a discovered flag and assigned the device identification code; and receive a PCIE device marked with the discovered flag and a corresponding device identification code.

2. The PCIE device management architecture according to claim 1, wherein a southbridge chip-platform controller hub is connected between the CPU and the baseboard management controller, and an embedded controller is arranged in the southbridge chip-platform controller hub.

3. A peripheral component interconnect express (PCIE) device management method adopting a PCIE device management architecture, wherein the PCIE device management architecture comprises:

a baseboard management controller, the baseboard management controller being internally provided with a baseboard management controller chip, a first PCIE switch chip, and a first PCIE controller, the baseboard management controller chip being connected with the first PCIE switch chip, and the first PCIE controller being configured in a Root Complex (RC) mode; and a central processing unit (CPU), the CPU being in communication connection with the baseboard management controller, the CPU being internally provided with a second PCIE controller, the second PCIE controller being configured in an endpoint device (EP) mode, the CPU being connected with a second PCIE switch chip, and the second PCIE switch chip being connected with a plurality of PCIE devices, wherein the plurality of PCIE devices are controlled directly by the baseboard management controller configured in the RC mode;

wherein the method comprises:

acquiring a driver program of the first PCIE switch chip, installing the driver program of the first PCIE switch chip to the baseboard management controller, and establishing a PCIE specification and protocol for communication between the baseboard management controller chip and the first PCIE switch chip;

configuring the first PCIE controller in the baseboard management controller to be in the RC mode, and configuring the second PCIE controller of the CPU to be in the EP mode; and directly controlling the plurality of PCIE devices by means of the baseboard management controller configured in the RC mode;

wherein the directly controlling the plurality of PCIE devices by means of the baseboard management controller configured in the RC mode comprises:

directly controlling the plurality of PCIE devices by means of the baseboard management controller configured in the RC mode and an MCTP control instruction;

wherein before the directly controlling the plurality of PCIE devices by means of the baseboard management controller configured in the RC mode and the MCTP control instruction, the method further comprises:

discovering the plurality of PCIE devices by means of an MCTP protocol, and assigning a device identification code to a discovered PCIE device and the baseboard management controller configured in the RC mode;

wherein the discovering the plurality of PCIE devices by means of an MCTP protocol, and assigning a device identification code to a discovered PCIE device and the baseboard management controller configured in the RC mode comprises:

sending a 0x0B control request broadcast packet to the plurality of PCIE devices, and notifying the device identification code of the baseboard management controller;

receiving a response 0x0B instruction of a PCIE device carrying an undiscovered flag, and acquiring the PCIE device carrying the undiscovered flag;

sending a 0x0C control request broadcast packet to the plurality of PCIE devices, and notifying the device identification code of the baseboard management controller;

receiving a response 0x0C instruction of the PCIE device carrying the undiscovered flag;

sending a 0x01 control request to the PCIE device carrying the undiscovered flag, and carrying the device identification code for configuring the PCIE device, marking the PCIE device carrying the undiscovered flag with a discovered flag, and assigning the device identification code to the plurality of PCIE device; and receiving a PCIE device marked with the discovered flag and a corresponding device identification code.

4. The PCIE device management method according to claim 3, wherein the configuring the first PCIE controller in the baseboard management controller to be in the RC mode comprises:

configuring a register of the first PCIE controller in the baseboard management controller, so as to configure the first PCIE controller in the baseboard management controller to be in the RC mode.

5. The PCIE device management method according to claim 4, wherein the configuring a register of the first PCIE controller in the baseboard management controller comprises:

configuring a controller register of the first PCIE controller in the baseboard management controller so as to configure a root port.

6. The PCIE device management method according to claim 5, wherein the configuring a register of the first PCIE controller in the baseboard management controller further comprises:

configuring a management component transport protocol (MCTP) register of the first PCIE controller in the baseboard management controller.

7. The PCIE device management method according to claim 6, wherein the configuring a register of the first PCIE controller in the baseboard management controller further comprises:

configuring a Direct Media Architecture memory Access (XDMA) register of the first PCIE controller in the baseboard management controller.

8. The PCIE device management method according to claim 7, wherein the configuring the second PCIE controller of the CPU to be in the EP mode comprises:

configuring the second PCIE controller of the CPU to be in the EP mode, so as to configure a terminal in which the CPU is located as a proxy terminal.

9. The PCIE device management method according to claim 8, wherein after the configuring the second PCIE controller of the CPU to be in the EP mode, the method further comprises:

making the baseboard management controller configured in the RC mode as a bus owner to acquire a management authority for the plurality of PCIE devices, so as to communicate with the plurality of PCIE devices by the terminal in which the CPU is located and that is configured as the proxy terminal.

10. The PCIE device management method according to claim 3, wherein the directly controlling the plurality of PCIE devices by means of the baseboard management controller configured in the RC mode comprises:

directly controlling the plurality of PCIE devices by means of the baseboard management controller configured in the RC mode and an address operation instruction.

11. The PCIE device management method according to claim 3, wherein the directly controlling the plurality of PCIE devices by means of the baseboard management controller configured in the RC mode comprises:

accessing a configuration space of the plurality of PCIE devices by means of the baseboard management controller configured in the RC mode; and performing device enable or disable control for the configuration space of the plurality of PCIE devices, and setting an interrupt mode of the plurality of PCIE devices.

12. The PCIE device management method according to claim 3, wherein the directly controlling the plurality of PCIE devices by means of the baseboard management controller configured in the RC mode further comprises:

acquiring device information of the plurality of PCIE devices by means of the baseboard management controller configured in the RC mode; and storing the device information of the plurality of PCIE devices into a memory of the baseboard management controller for display of the device information on a display interface.

13. The PCIE device management method according to claim 3, further comprising:

acquiring fault information of the plurality of PCIE devices by means of the baseboard management controller configured in the RC mode.

14. The PCIE device management method according to claim 3, wherein before the sending a 0x0B control request broadcast packet to the plurality of PCIE devices, and notifying the device identification code of the baseboard management controller, the method further comprises:

receiving a 0x0D control request sent by the plurality of PCIE devices, and acquiring the PCIE device carrying an undiscovered flag; and sending a response 0x0D instruction to the PCIE device carrying the undiscovered flag.

15. The PCIE device management method according to claim 3, further comprising:

configuring the first PCIE controller in the baseboard management controller to be in the EP mode, and configuring the second PCIE controller of the CPU to be in the RC mode; and directly controlling the plurality of PCIE devices by means of the CPU configured in the RC mode.

16. A computer device, comprising a memory, a processor, and a computer-readable instruction stored on the memory and capable of running on the processor, wherein the processor, when executing the computer-readable instruction, is configured to perform a peripheral component interconnect express (PCIE) device management method adopting a PCIE device management architecture, wherein the PCIE device management architecture comprises:

a baseboard management controller, the baseboard management controller being internally provided with a baseboard management controller chip, a first PCIE switch chip, and a first PCIE controller, the baseboard management controller chip being connected with the first PCIE switch chip, and the first PCIE controller being configured in a Root Complex (RC) mode; and a central processing unit (CPU), the CPU being in communication connection with the baseboard management controller, the CPU being internally provided with a second PCIE controller, the second PCIE controller being configured in an endpoint device (EP) mode, the CPU being connected with a second PCIE switch chip, and the second PCIE switch chip being connected with a plurality of PCIE devices, wherein the plurality of PCIE devices are controlled directly by the baseboard management controller configured in the RC mode;

wherein the (PCIE) device management method comprises:

acquiring a driver program of the first PCIE switch chip, installing the driver program of the first PCIE switch chip to the baseboard management controller, and establishing a PCIE specification and protocol for communication between the baseboard management controller chip and the first PCIE switch chip;

configuring the first PCIE controller in the baseboard management controller to be in the RC mode, and configuring the second PCIE controller of the CPU to be in the EP mode; and directly controlling the plurality of PCIE devices by means of the baseboard management controller configured in the RC mode;

wherein the directly controlling the plurality of PCIE devices by means of the baseboard management controller configured in the RC mode comprises:

directly controlling the plurality of PCIE devices by means of the baseboard management controller configured in the RC mode and an MCTP control instruction;

wherein before the directly controlling the plurality of PCIE devices by means of the baseboard management controller configured in the RC mode and an MCTP control instruction, the PCE device management method further comprises:

discovering the plurality of PCIE devices by means of an MCTP protocol, and assigning a device identification code to a discovered PCIE device and the baseboard management controller configured in the RC mode;

wherein the discovering the plurality of PCIE devices by means of an MCTP protocol, and assigning a device identification code to a discovered PCIE device and the baseboard management controller configured in the RC mode comprises:

sending a 0x0B control request broadcast packet to the plurality of PCIE devices, and notifying the device identification code of the baseboard management controller;

receiving a response 0x0B instruction of a PCIE device carrying an undiscovered flag, and acquiring the PCIE device carrying the undiscovered flag;

sending a 0x0C control request broadcast packet to the plurality of PCIE devices, and notifying the device identification code of the baseboard management controller;

receiving a response 0x0C instruction of the PCIE device carrying the undiscovered flag;

sending a 0x01 control request to the PCIE device carrying the undiscovered flag, and carrying the device identification code for configuring the PCIE device, marking the PCIE device carrying the undiscovered flag with a discovered flag, and assigning the device identification code to the plurality of PCIE device; and
receiving a PCIE device marked with the discovered flag and a corresponding device identification code.

17. The PCIE device management method according to claim 6, wherein the configuring a management component transport protocol (MCTP) register of the first PCIE controller in the baseboard management controller comprises:
configuring communication protocols related to a MCTP of the MCTP register of the first PCIE controller in the baseboard management controller.

\* \* \* \* \*